United States Patent [19]

Huellwegen

[11] 4,128,743
[45] Dec. 5, 1978

[54] CIRCUIT ARRANGEMENT FOR BLOCKING A BIDIRECTIONAL AMPLIFIER AGAINST RECEIVING OUTGOING SIGNALS

[75] Inventor: Josef Huellwegen, Altenbeken, Fed. Rep. of Germany

[73] Assignee: Nixdorf Computer AG, Paderborn, Fed. Rep. of Germany

[21] Appl. No.: 728,438

[22] Filed: Sep. 30, 1976

[30] Foreign Application Priority Data

Oct. 1, 1975 [DE] Fed. Rep. of Germany ....... 2543861

[51] Int. Cl.² .......................... H04B 1/58; H04B 3/36
[52] U.S. Cl. .......................... 179/170 R; 179/170 NC
[58] Field of Search ........... 179/170 R, 170 T, 170 D, 179/170 NC

[56] References Cited

U.S. PATENT DOCUMENTS

| 3,530,260 | 9/1970 | Gaunt, Jr. ...................... 179/170 NC |
| 3,612,781 | 10/1971 | Da Costa et al. ............. 179/170 NC |
| 3,970,805 | 7/1976 | Thomas ......................... 179/170 NC |
| 4,039,766 | 8/1977 | Picandet ........................ 179/170 NC |

OTHER PUBLICATIONS

Appel and Abramson; "Electronic Hybrid for Telephone Using a Differential Amplifier;" IBM Technical Disclosure Bulletin; Oct. 1973; p. 1513.

Primary Examiner—Kathleen H. Claffy
Assistant Examiner—Randall P. Myers
Attorney, Agent, or Firm—Blanchard, Flynn, Thiel, Boutell & Tanis

[57] ABSTRACT

A circuit for the reciprocal transmission of signals through transmitting channels. The circuit has amplifiers therein for amplifying the signals being transmitted in opposite directions along the line. A pair of electronic hybrid circuits are provided so that the signals which are emitted by one amplifier and which must be transmitted in one direction do not overdrive the input of a further amplifier which is provided for amplification of signals to be transmitted in the other direction. A circuit is provided in each of the electronic hybrid circuits for the continuous production of a reference signal which is fed to a comparator circuit connected to the input of the amplifier so that the signals arriving at the amplifier can be compared with the outgoing signals that are being transmitted in the opposite direction. The reference voltage is controlled with respect to its magnitude and phase so that it corresponds to the voltage produced by the outgoing signals and any difference existing between the reference voltage and the outgoing signals will cause the comparator circuit to produce a signal to effectively prevent the outgoing signals from reaching the input to the amplifier.

8 Claims, 5 Drawing Figures

CIRCUIT ARRANGEMENT FOR BLOCKING A BIDIRECTIONAL AMPLIFIER AGAINST RECEIVING OUTGOING SIGNALS

FIELD OF THE INVENTION

The invention relates to a circuit arrangement for blocking input of a bidirectional amplifier, which input is provided for amplifying arriving signals, for the signal transmission in communication systems, in particular data transmitting systems, against receiving outgoing signals.

BACKGROUND OF THE INVENTION

During the reciprocal transmission of signals through transmitting channels and in particular through very long lines it is necessary, due to the attenuation which is produced on the transmitting channel or on the line, to insert amplifiers at regular intervals, with which amplifiers the respectively received signals are upgraded and amplified, so that they can then be further transmitted undistorted or with an amplified amplitude. As long as such amplifiers are only used for a transmitting device, their structure is relatively unproblematic. However, if such amplifiers are used in a bidirectional transmission, one must be sure that the signals which are emitted by one amplifier and which must be transmitted in a pregiven direction do not overdrive the input of a further amplifier, which is provided for the amplification of signals which arrive from this direction.

To avoid such damaging effects, filter arrangements are already known in communication systems in the form of the socalled switch circuits, with which it is possible to evaluate the transmitting direction of signals by their frequency and to assure in this manner that the outgoing signals do not reach the input of an amplifier which is provided for the arriving signals. However, such arrangements are useless, if for example digital signals are being transmitted, the frequency of which is the same for both transmitting directions. Furthermore the use of filter arrangements is associated always with an additional damping and signal distortion, so that the utilization of such arrangements in particular in the transmission of digital signals is not possible.

Therefore the purpose of the invention is to provide a circuit arrangement which operates without any filter of the common type and assures, independent from the frequency, the blocking of the input of a bidirectional amplifier against outgoing signals.

A circuit arrangement of the abovementioned type is constructed inventively to attain said purpose by the outgoing signals controlling a circuit for the continuous production of a reference voltage, which is fed to a comparator circuit which is arranged in front of the input for the purpose of a comparison with voltage which is there produced by the outgoing signals, and by the production of the reference voltage being controlled with respect to magnitude and phase corresponding with the voltage produced by the outgoing signals by means of a controlled condition, which is produced depending on a signal voltage, which is emitted, if necessary, by the comparator circuit.

The invention is based on the recognition that it is possible to compensate an amplified signal, which is emitted by a bidirectional amplifier, at the input of the bidirectional amplifier, which input is provided for the arriving signals, so that it cannot override this input, but that only arriving signals can be switched active at this input. This makes it possible to transmit signals on a transmitting channel simultaneously in two directions and to feed these through a bidirectional amplifier. Through the reference voltage, which is continuously produced in the inventive circuit arrangement from the amplified signals which occur at the output of a bidirectional amplifier and their adjustment to the voltage which is produced by these signals, it is possible to achieve a compensation effect for the outgoing amplified signals at the input of the bidirectional amplifier, because in the case of a perfect adjustment or "compensation" the output voltage of the comparator circuit assumes the value zero and therefore the input cannot be overdriven. A controlled condition can be derived from a voltage which is emitted, if necessary, by the comparator circuit and the reference voltage can be measured always exactly at any moment with respect to magnitude and phase so that it corresponds with the voltage which is produced by the outgoing signals and which receives certain distortions caused by the connected line or by its capacitive component and line attenuation. This permits an exact control to be possible independent from the length and the electric values of the connected line such that the difference between the outgoing signals and the comparison voltage receives always the value zero. This operation can take place automatically so that the effect is achieved that signals can be transmitted simultaneously in two directions, because only the outgoing signals are made ineffective at the input of the bidirectional amplifier. The invention utilizes thereby the fact that the outgoing signals practically never correspond with the arriving signals, so that the production of the reference voltage can be controlled by means of a controlled condition, which is not derived continuously, but at timed intervals, whereby these timed intervals can be controlled by the outgoing signals. This method makes it possible to cancel the influence of arriving signals on the mentioned comparison operation, so that the reference voltage compensates indeed only just the outgoing signals at the input of the bidirectional amplifier.

The circuit arrangement can advantageously be further developed such that the circuit for producing the reference voltage is a network which is connected to the line termination circuit for the line and which is connected to the bidirectional amplifier, which network contains variable resistors for reproducing the capacitive and the ohmic or resistive characteristics of the line. Through such a network, it is possible to reproduce the two line conditions which mainly distort the outgoing signals to a certain degree, so that the compensation voltage receives practically the same changes as the outgoing signals. This circuit principle can be accomplished very easily with a resistance network.

The comparator circuit may be a control transistor, which is arranged in front of the mentioned input, preferably a MOS field effect transistor, which is controlled at the gate electrode by the reference voltage and the operating current circuit which is connected to the potential existing on the connected line. Through this it is achieved that only one single control element is needed for the comparison, because if the reference voltage which is fed to the gate electrode corresponds with the potential which exists on the connected line and which is produced by the outgoing signals, the control transistor is blocked, so that at its output, as a compensation result, the voltage is emitted with the value zero, when the two supplied control magnitudes correspond exactly.

To transmit digital signals, the circuit arrangement according to the invention is preferably constructed so that for adjusting the variable resistors, two control loops, which each contain an integral control circuit, are provided and that the first control loop is switched active for a predetermined time prior to the rising flank of each one outgoing signal and for the same time after the rising flank of each one outgoing signal and the second control loop for the remaining time of this signal. This embodiment of the invention makes it possible in a particularly simple manner to carry out the above-described control operations in dependency of the outgoing signals in timely intervals. Due to the fact that the first control loop is switched active for a predetermined time prior to and for the same time after the rising flank of each one outgoing signal, there occurs a controlling of the distortions of the outgoing signals, which distortions are produced mainly by the capacitive and resistive characteristics of the connected line. Since the second control loop is switched active for the remaining time of the respective signal, it is possible to carry out during this time a control of the attenuation of the emitted signals, which attenuation is caused by the resistive characteristics of the connected line.

Of course it is also possible to process for example sinusoidal signals with the last-described embodiment of the invention, if the produced or amplified or also arriving signals are being transformed correspondingly for processing in a digitally operating circuit arrangement.

A particularly advantageous further development of the invention is characterized by the control transistor being associated with a circuit which is arranged in front of the mentioned input for the galvanic decoupling and serving as a modulation element for a high frequency oscillatory circuit which is provided within said circuit and which is part of a decoupling transmitter. Since between the amplifier stages or reception inputs of a bidirectional amplifier and the respectively connected line a potential-free coupling is needed, in this further development of the invention the control transistor which forms the comparator circuit is used simultaneously as an active element with which the galvanic separation between the line and the respective amplifier input is possible by modulation of the high-frequency oscillatory circuit. The control transistor which is used as the modulation element receives thereby an operating voltage so to speak from the voltage which is produced at the high frequency oscillatory circuit by feeding in a high-frequency oscillation, so that no separate operating voltage is needed.

BRIEF DESCRIPTION OF THE DRAWINGS

One exemplary embodiment will be described hereinafter in connection with the drawings, in which.

DETAILED DESCRIPTION

Figure 1:
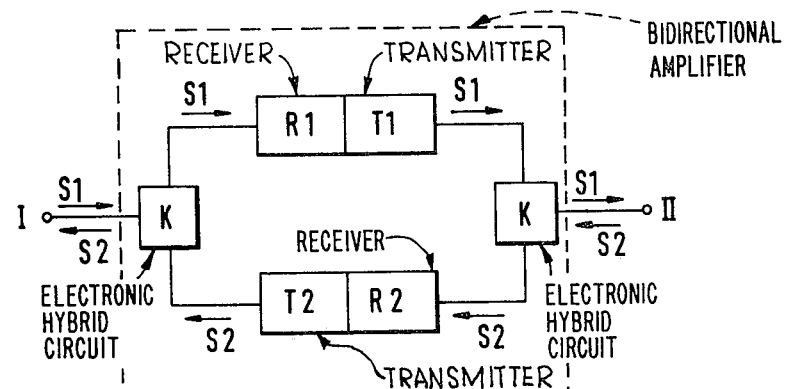
FIG. 1 is a block diagram of a bidirectional amplifier, which is equipped with electronic hybrid circuit arrangements according to the invention.

FIG. 1 illustrates a bidirectional amplifier having a pair of terminals I and II which can be connected at one terminal I to a first transmitting line and at its other terminal II to a second transmitting line. The transmitting lines may, for example, be two-wire lines or also transmitting channels of another kind. The bidirectional amplifier receives signals S1 through its terminal I and amplifies these signals in a first amplifier part which consists of a receiver R1 and a transmitter T1, so that the signals S1 after amplification can again be emitted through the terminal II. For the other transmitting direction, a second amplifier part is provided having a receiver R2 and a transmitter T2. Signals S2 are transmitted in this direction through the circuit. Thus each terminal I and II has associated with it an electronic hybrid circuit which is connected to a receiver R on one side and a transmitter T on the other side. An electronic hybrid circuit arrangement embodying the invention is identified with the letter K and prevents, for example, the signals S2 which are emitted by the lower transmitter T2 from reaching the input of the upper receiver R1 to overdrive same. Thus the two electronic hybrid circuits K assure that the receiver R1 receives, in the upper amplifier part, only the signals S1 and the receiver R2 receives in the lower amplifier part, only the signals S2.

Figure 2:
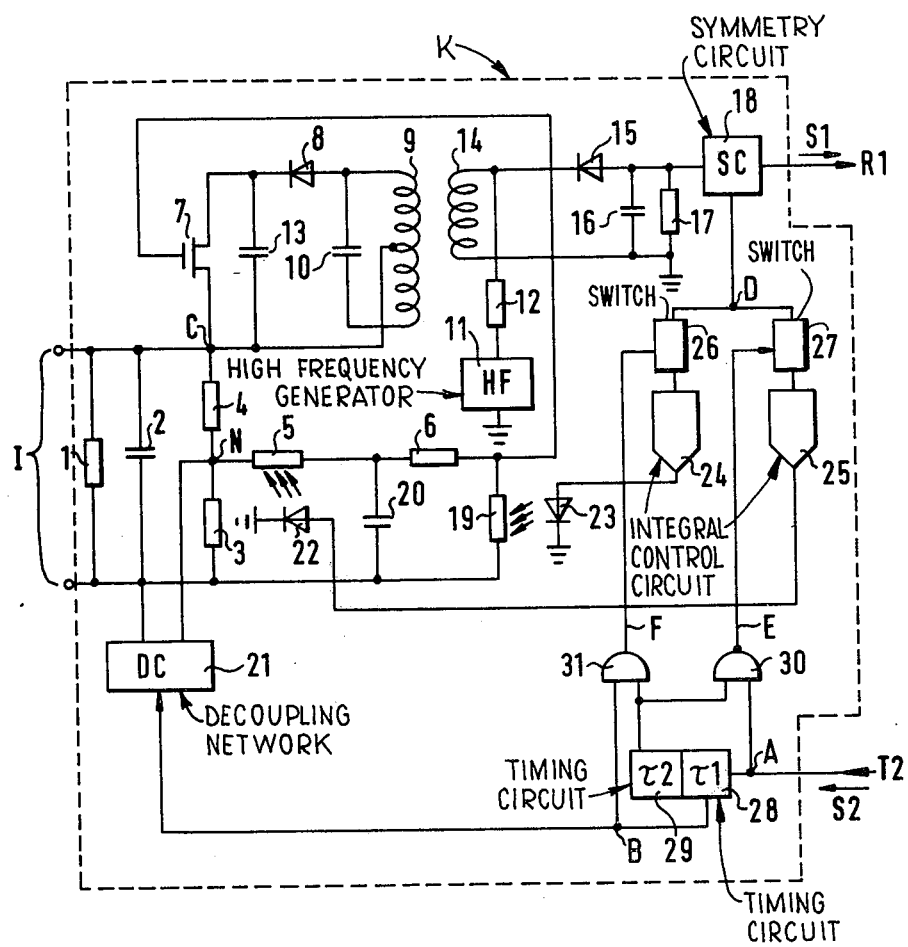
FIG. 2 shows a simplified illustration of an electronic hybrid circuit.

An electronic hybrid circuit arrangement K according to FIG. 1 is more clearly illustrated in FIG. 2. This circuit arrangement has on its left side two input terminals I, which correspond to the terminal I which is illustrated in FIG. 1. Here a two-wire line can be connected. Furthermore, at the right part of the circuit arrangement which is shown in FIG. 2 the connection possibilities to a receiver R1 or a transmitter T2 are indicated by arrows.

In the circuit arrangement which is shown in FIG. 2, it is also illustrated that signals S1 for a first transmitting direction must be fed to the receiver R1, while signals S2 for a second transmitting direction are emitted from the transmitter T2.

First, the circuit and the function thereof for the normal receipt of arriving signals through the input terminals I and their transmission to the receiver R1 will be described. The arriving signals come from the connected line I to a terminal circuit which is formed of resistors 1,3 and 4 and a capacitor 2. The resistors 3 and 4 are series connected across the two-wire line and the resistor 1 is connected in parallel therewith as is the capacitor 2. Resistors 5 and 6 are series connected from a junction point N between the resistors 3 and 4 to the control electrode of a MOS field effect transistor 7. The arriving signals on the two-wire line may be, for example, digital rectangular double current signals and have in this case mostly an amplitude in the order of magnitude of 10 mV to 1 V, this value depending on the length of the connected line I. If the relationship of the values of the resistors 3 and 4 with respect to one another is approximately 1 : 10, then there appears on the resistor 4 practically the full receiving voltage which is produced by the arriving signals. This voltage is fed through the series connected resistors 5 and 6 onto the gate electrode of a MOS field effect transistor 7, so that it receives a corresponding potential, compared with the potention on the line part which is connected to the source electrode of the field effect transistor 7.

The cathode of a diode 8 is connected to the drain electrode of the field effect transistor 7. The anode thereof is connected to one end of an inductor 9 having an intermediate tap thereon and a capacitor 10. The other end of the inductor 9 and capacitor 10 are connected together. The center tap is connected to a junction C on the opposite side of the resistor 4. The junction C is also connected to the source electrode of the field effect transistor and through a capacitor 13 to the cathode of the diode 8.

The inductor 9 and the capacitor 10 form a high-frequency oscillatory circuit. High-frequency oscillations from a high-frequency generator 11 are fed into the high-frequency oscillatory circuit through a resistor 12 and a coupling inductor 14 which is galvanically separate from the inductivity 9. If the oscillator circuit 9,10 is tuned to the frequency of the oscillations emitted by the generator 11, then it has a correspondingly high resonance resistance, at which a resonance potential drops off, which is rectified through the diode 8 and is smoothened by the capacitor 13. The MOS field effect transistor 7 is fed by this voltage so to speak as the operating voltage. The transistor 7 acts then, during the controlling of its gate electrode with the described signal voltage, as a modulation element and the resonance potential which occurs at the oscillatory circuit 9,10 is modulated thereby. The inductor 9 is connected through a center tap to the junction C which delivers the reference potential for the MOS field effect transistor 7 so that the oscillatory circuit 9,10 is not detuned by a connection to the line.

One end of the coupling inductor 14 is connected to the cathode end of a diode 15 with the anode thereof being connected to a terminal on a symmetry circuit 18. A parallel connected resistor 17 and capacitor 16 are connected between the anode of the diode 15 and the other end of the coupling inductor 14.

Figure 4:
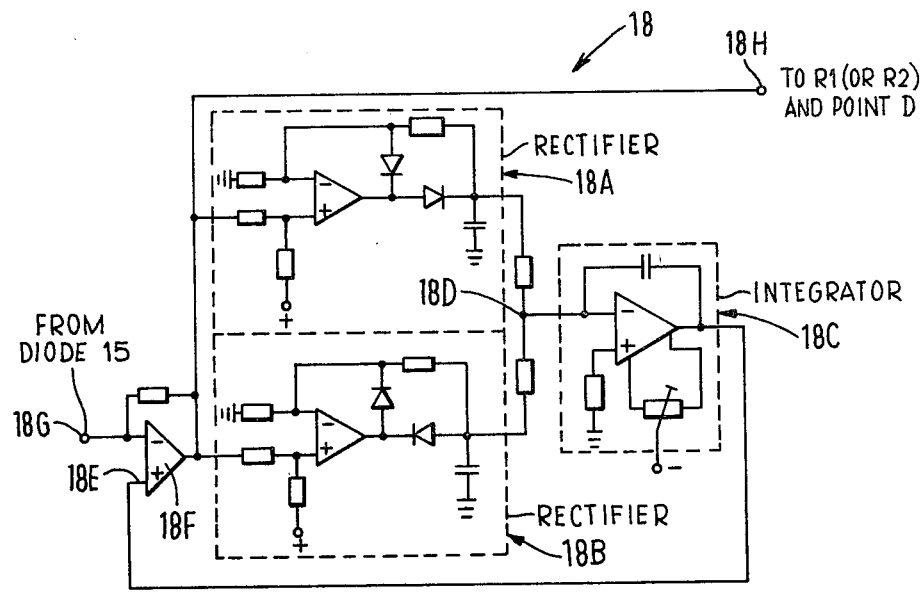
FIG. 4 is a detailed schematic diagram of the symmetry circuit.

The coupling inductor 14 serves at the same time to uncouple a high-frequency voltage from the oscillatory circuit 9,10, which high-frequency voltage is modulated in accordance with the control of the MOS field effect transistor 7. The high-frequency voltage is rectified by the rectifier diode 15, which causes a demodulation and the signal voltage appears again on the RC members 16,17, which signal voltage is produced by the arriving signals and which, however, has a d.c. voltage part superposed. This d.c. voltage part can be cancelled in the symmetry circuit 18 which then feeds the exact signal voltage in form of the signals S1 to the receiver R1. The symmetry circuit 18 is illustrated in detail in FIG. 4. It is comprised of two rectifier stages 18A and 18B and an integrator stage 18C. The positive and negative signals from the rectifier stages 18A and 18B are summed at point 18D and fed through the integrator stage 18C to a reference input terminal 18E on an amplifier 18F which is controlled by the signals arriving at the terminal 18G to thereby emit at terminal 18H the symmetrized signals.

The described type of transmission of the arriving signals onto the receiver R1 is done galvanically separate from the connected line.

If now a signal S2 which is amplified by the transmitter T2 must be transmitted onto the line connected to the terminal I, it must be prevented that the amplified signal reaches the receiver R1 and overdrives same. For this purpose the resistance network which is formed of the resistors 5,6 and 19 and the capacitor 20 is provided. One end of the resistor 19 is connected to the resistor 6 and the gate electrode of the field effect transistor 7 and the other end thereof is connected to the end of the resistor 3 remote from the junction point N. The capacitor 20 is connected to a point between the resistors 5 and 6 and to the other end of the resistor 19. In addition, the resistors 5 and 19 are photoresistors controlled by a circuit having light emitting diodes 22 and 23 located in close proximity to the photoresistors 5 and 19, respectively. The circuit for controlling the light emitting diodes 22 and 23 is composed of two timing circuits 28 and 29, a NAND-gate 30 and an AND-gate 31. The line to the transmitter T2 is connected through a junction point A to the timing circuit 28 and one input terminal to the NAND-gate 30. The output from the timing circuit 28 is connected through the junction point B to the input to a decoupling network 21 and an input terminal to the AND-gate 31. The timing circuit 29 is connected to the timing circuit 28 and is activated in response to a timing out of the timing circuit 28. The output of the timing circuit 29 is connected to the other input terminals I to the AND-gate 31 and NAND-gate 30.

The symmetry circuit 18 is connected through a junction point D to one terminal of a switch 26. The other terminal of the switch 26 is connected through an integral control circuit 24 (FIG. 5) and the light emitting diode 23 to ground. Similarly, the junction point D is also connected to one terminal of a switch 27. The other terminal of the switch 27 is connected through the integral control circuit 25 (FIG. 5) and the light emitting diode 22 to ground.

The amplified signal on the resistance network is coupled in at the junction point N, after it is fed through the galvanic decoupling network 21. By connecting the line to the terminal I, the voltage which exists in the amplified signal S2 at the circuit point C is deformed. The resistance network now is used to feed a voltage onto the gate electrode of the MOS field effect transistor 7, which is formed exactly after this deformed signal voltage and is derived from the voltage coupled in at N. This deformation is done with the two photoresistors 5 and 19 which are influenced by the light emitting diodes 22 and 23. Through the circuit of the resistance network which is illustrated in FIG. 2, a signal deformation is derived from the resistor 5 and the capacitor 20 and can be adjusted by changing the resistance value of the resistor 5 so that it exactly corresponds with the signal deformation which is produced by the capacitive component of the connected line I. The resistor 19 deforms the amplitude of the voltage which is transmitted by the resistance network onto the MOS field effect transistor 7 and can be adjusted so that the amplitude deformation corresponds exactly with the one which is caused by the ohmic or resistive component of the connected line.

If now the signal voltage which is reproduced by the resistance network corresponds exactly with the signal voltage, which is produced at the connected line I by the amplified signal S2, the gate electrode and the source electrode of the MOS field effect transistor 7 carry corresponding potential, at a suitable dimensioning of the resistance network, which means that the MOS field effect transistor 7 is controlled with a control voltage of 0 Volt. This prevents a corresponding modulation at the described oscillatory circuit 9,10, so that no corresponding signal can be decoupled at this oscillatory circuit. Thus the transmitting signal S2 is completely compensating for the receiver R1. This, however, does not affect the arriving signals, because these can cause a control voltage at the gate electrode of the MOS field effect transistor 7 in the described manner.

Figure 5:
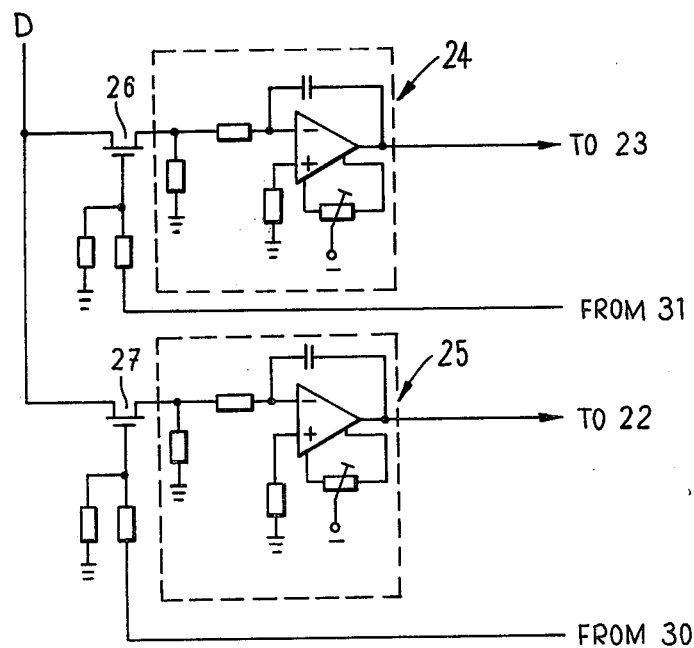
FIG. 5 is a detailed schematic diagram of the integral control circuits.

The photoresistors 5 and 19 are adjusted by two control loops which are optically coupled, as stated above, to the light emitting diodes 22 and 23. The control loops are controlled by two integral control circuits 24 and 25, which in turn each receive a control signal through the switches 26 and 27, and which are preferably constructed as MOS field effect transistors as shown in FIG. 5. The symmetrized signal, which is emitted by the symmetry circuit 18, is fed to the integral control circuits 24 and 25 through the two switches 26 and 27.

If now the outgoing transmitting signal S2 and the signal which is reproduced corresponding to same are different at the gate electrode of the MOS field effect transistor 7, then the symmetry circuit 18 emits a signal which is fed to the integral control circuits 24 and 25 through the switches 26 and 27. The integral control circuits 24 and 25 in turn emit an output signal, with which the photoresistors 5 and 19 can be adjusted through the light emitting diodes 22 and 23 in such a manner that the resistance network becomes dimensioned in the sense of a complete compensation for the outgoing transmitting signals S2 at the field effect transistor 7 to define a comparator circuit.

The switches 26 and 27 are closed at different times by control signals which are controlled by the outgoing signal S2. This is done in a schematically illustrated switching arrangement which is formed of the two aforementioned timing circuits 28 and 29, the NAND-gate 30 and the AND-gate 31. If a rectangularly shaped signal S2 is emitted from the transmitter T2 onto the junction point A, this signal first effects a closing of the switch 27. Furthermore, this signal is produced again delayed by the time interval $\tau 1$ at the circuit point B and is fed as a delayed transmitting signal S2 through the decoupling network 21 onto the connected line I. The front or leading edge of the signal at the circuit point A is again delayed by the time constant $\tau 2$ in the timing circuit 29, this time constant preferably corresponding with the time constant $\tau 1$. At the output of the timing circuit 29 appears then an edge of a pulse which closes the switch 26 through the AND-gate 31 and at the same time causes, through the signal which is still at the circuit point A through the NAND-gate 30, an opening of the switch 27. If the signal which exists at the circuit point A disappears, the switch 27 is also again opened.

Figure 3:
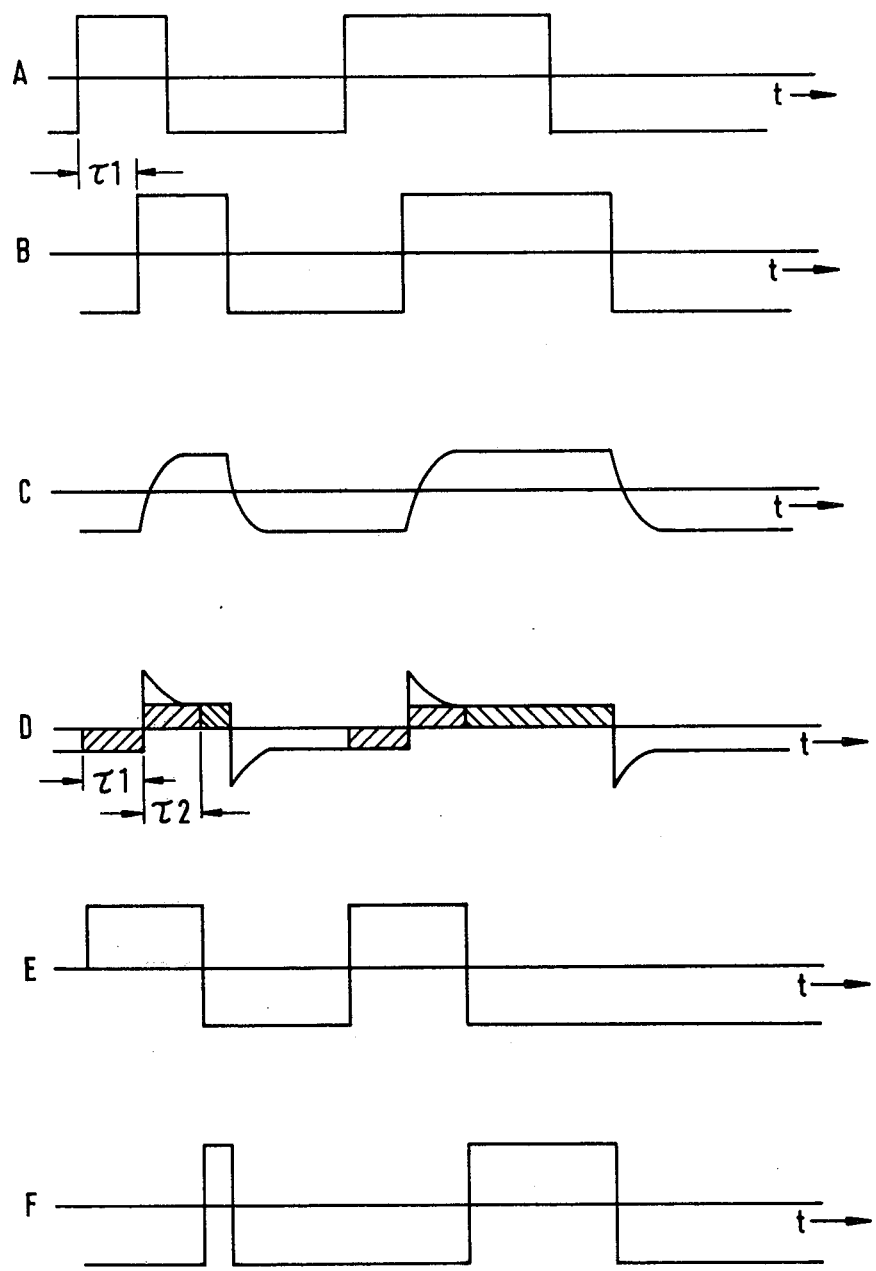
FIG. 3 illustrates signal waveforms to clarify the method of operation of the circuit which is shown in FIG. 2.

To better understand these operations, the signal waveforms at the circuit points A to F in the circuit of FIG. 2 are illustrated in FIG. 3. A rectangular double current signal is illustrated at A, which signal may be the signal S2 emitted by the transmitter T2. At B the rectangular double current signal is shown to be delayed by the time constant $\tau 1$. The signal waveform C shows the voltage which occurs at the circuit point C, which voltage is caused by the delayed rectangular double current signal at B and is deformed with respect to its leading and trailing flanks or edges and its amplitude by the corresponding resistive and capacitive components of the connected line I. FIG. 3 shows at D the signal which controls the two integral control circuits 24 and 25 in case that an incomplete compensation of the signal voltage, which is produced by the outgoing signals, occurs through the control voltage at the MOS field effect transistor 7, which control voltage is emitted by the resistance network 5, 6, 19 and capacitance 20. This complete compensation leads to a signal waveform being created at the circuit point D which is symmetrized by the symmetry circuit 18 and which, however, should not be a perfect compensation but approximates the difference between the two signals B and C. This can easily be recognized from the illustration in FIG. 3. If now, as is shown at D in FIG. 3, at the time of the leading edge of the signal A, the switch 27 is closed and is opened again delayed by the time interval $\tau 1 + \tau 2$, then the integral control circuit 25 emits a signal during the time $\tau 2$ which corresponds with the integral of the signal peak which occurs above the part of the signal D, which part is indicated by shading. The two shaded signal parts, which are illustrated at $\tau 1$ and $\tau 2$, have corresponding magnitudes, so that they cannot appear as an integral value at the output of the integral control circuit 25. Thus indeed only the signal peak, which occurs during the leading edge of the signal C, is controlled at the signal D, so that through the light emitting diode 22 the photoresistor 5 is adjusted accordingly in such a manner that this signal peak no longer appears in the compensation signal.

At the end of the time interval $\tau 2$, the switch 26 is closed and the switch 27 is opened. The correspondingly shaded remainder of the signal impulse D which is shown in FIG. 3 is controlled through this until the end of the signal impulse, which end is delayed for the time interval $\tau 1$. Thus it is possible to detect the deformation of the signal voltage which occurs at the connected line I and which is caused by the ohmic or resistive component of the line. Thus the integral control circuit 24 emits a signal, which corresponds with the amplitude of the signal part of the signal illustrated in FIG. 3 at D, which signal part still remains with the time interval $\tau 2$ running out. The photoresistor 19 can then be adjusted through the light emitting diode 23 in such a manner that this amplitude portion disappears in the compensation signal. In this manner, the two portions of the signal deformation, which portions are caused by the resistive and the capacitive components of the connected line I, are detected, and a control of these signal portions can occur in such a manner that they will finally disappear at the circuit point D and the signal voltage, which is produced by the outgoing signals S2, at the line termination corresponds exactly with the reproduced voltage at the gate electrode of the MOS field effect transistor 7.

FIG. 3 illustrates at E and at F furthermore the control signals which occur at the circuit points E and F in FIG. 2, which control signals cause a timed staggered operation of the two switches 26 and 27 which are arranged in front of the integral control circuits 24 and 25. As has already been discussed, the control signal E follows on one side the rising or leading flanks of the transmitting signal A, on the other side it is terminated after the time interval $\tau 2$ has run out. The control signal F starts with the expiration of the time interval $\tau 2$ and ends with the dropping or trailing flank of the delayed transmitting signal S2, which is illustrated at B and is transmitted to the connected line I.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A bidirectional amplifier circuit arrangement for use in a bidirectional transmission line to prevent first signals travelling in a first direction from interfering with second signals travelling in a second direction, comprising:

means defining a pair of separate circuits through said bidirectional amplifier circuit;

a pair of electronic hybrid circuits positioned at the juncture between the ends of said pair of separate circuits and the mutually adjacent ends of said transmission line, each of said electronic hybrid circuits having a first input terminal connected to one of said ends of said transmission line, a second input terminal connected to one of said ends of one of said separate circuits and an output terminal connected to one of said ends of the other of said separate circuits, said electronic hybrid circuits further including:

(a) reference voltage generating means having an input connected in circuit with said first input terminal for continuously producing a first voltage signal at the output thereof in response to the impedance characteristic of said one of said transmission lines connected to said first input terminal, said reference voltage generator means including a variable resistor network for reproducing the capacitive and the resistive characteristics of said one of said transmission lines;

(b) signal producing means connected in circuit with said first input terminal and said input to said reference voltage generating means for producing a second voltage signal in response to said second signal from the other of said transmission lines connected in circuit with said second input terminal;

(c) means operatively connected to said variable resistor network of said reference voltage generating means for superposing a control of the magnitude and phase of said first voltage signal thereby producing a third voltage signal corresponding to the magnitude and phase of said second signal;

(d) comparator circuit means operatively connected to said output from said reference voltage generating means and said first input terminal for comparing said second and third voltage signals thereat and effecting the production of a fourth voltage signal in response thereto; and (e) means operatively connected to said comparator circuit means and being responsive to said fourth voltage signal for controlling said superposing means for effecting a cancelling of said second signal thereby preventing it from reaching said output terminal while simultaneously transmitting said second signal to said one of said ends of said transmission line and remaining ready to receive said first signals from said one of said ends of said transmission lines and passing them through to said output terminal.

2. The circuit arrangement according to claim 1, wherein the comparator circuit means is arranged before said output and comprises a MOS field effect transistor having a gate electrode, a source electrode and a drain electrode, said gate electrode being controlled by said third voltage signal, and said source electrode having said second voltage signal applied thereto.

3. The circuit arrangement according to claim 2, in particular for the transmission of digital signals, wherein said variable resistor network includes variable resistors and wherein for adjusting the variable resistors of said variable resistor network, said superposing means is provided which includes first and second control loops which each contain an integral control circuit, said first control loop being operatively connected to one of said variable resistors and to said second input terminal through a first signal duration control device operable for a first predetermined time ($\tau 1$) and said second control loop being operatively connected to the other of said variable resistors through a second signal duration control device operable for a second predetermined time ($\tau 2$), wherein said first control loop is switched active for said first predetermined time ($\tau 1$) prior to the rising edge of each one of said second signals applied to said second input terminal and for a second predetermined time ($\tau 2$) after the rising edge of each one of said second signals and wherein said second control loop is switched active for the remaining time of said second signals delayed by the sum of said first and second predetermined times ($\tau 1 + \tau 2$).

4. The circuit arrangement according to claim 3, wherein said two variable resistors are photoresistors, said photoresistors being opto-electronically coupled to said integral control circuits.

5. The circuit arrangement according to claim 4, wherein a first one of said photoresistors controls a capacitive shunt to said second voltage signal which is applied to said first input terminal and a second one of said photoresistors controls an ohmic shunt to said second voltage signals and which is connected to said first input terminal at a circuit point (C) to which is fed the input voltage produced by the arriving signals on said one of said transmission lines.

6. The circuit arrangement according to claim 5, wherein said integral control circuits are coupled to said photoresistors through light emitting diodes.

7. The circuit arrangement according to claim 3, wherein control signals for switching active said two control loops are produced by said second signals to effectively alter the length of said second voltage signal to correspond with the sum of said first and second predetermined times ($\tau 1 + \tau 2$), and wherein said second voltage signal is produced following a delay of said first predetermined time ($\tau 1$) from the occurrence of said second signals.

8. The circuit arrangement according to claim 2, wherein said comparator circuit means further includes a high-frequency resonant circuit comprising an inductance and capacitance and a galvanic coupling device operatively connecting said high-frequency resonant circuit between said drain and source electrodes of said MOS field effect transistor, said MOS field effect transistor functioning as a modulation element for said high-frequency resonant circuit which is part of a decoupling transmitter.

* * * * *